United States Patent

Carmouche

[11] 4,079,519
[45] Mar. 21, 1978

[54] ROAD DELINEATORS

[76] Inventor: William J. Carmouche, 353 Stanford Ave., Baton Rouge, La. 70808

[21] Appl. No.: 713,917

[22] Filed: Aug. 12, 1976

[51] Int. Cl.² ............................................. G01C 21/00
[52] U.S. Cl. ..................................................... 33/264
[58] Field of Search ......................................... 33/264

[56] References Cited

U.S. PATENT DOCUMENTS

| 1,429,166 | 9/1922 | Rommer | 33/264 |
| 3,834,036 | 9/1974 | Scarritt | 33/264 |

Primary Examiner—Steven L. Stephan

[57] ABSTRACT

A pair of protruding forms, shapes or objects serving as steering aids or safety devices affixed asymmetrically to the left side of the hood or radiator of a car, as viewed from the driver's seat, methodically situated in such a position as to correlate each of the two forms, designated as road delineators, to its adjacent boundary line of the traffic lane in order that the driver can determine conveniently, correctly and continuously the exact distance of the car from either boundary of the roadway, enabling motorists, as they maintain their normal driving posture, to avoid accidents.

1 Claim, 4 Drawing Figures

ROAD DELINEATORS

ESSENTIAL NEED

Many traffic studies have revealed that most collisions and sideswiping in automobile accidents can be blamed on steering beyond the confines of the proper lane. This dangerous way of driving is not a matter of carelessness or indifference. It is almost inevitable because no driver is provided with any satisfactory or practical means for correctly determining the actual position of a car relative to the boundaries of a traffic lane. He can only guess whether he is only a few inches or a few feet from the limits of the boundary lines. This appalling deficiency in our auto steering system is the major cause of the vast destruction wrought every year on our streets and highways. The importance of the problem is clearly manifest by the fact that the annual costs of the damage resulting from automobile accidents exceeds eighteen billion dollars, in the United States alone. Most motorists are lured into a false confidence in their driving ability by the great width of our modern and expensive traffic routes. Objective tests have demonstrated conclusively that virtually all drivers are incapable of judging when the side of their cars approach boundary line. Consequently thay are not able to steer safely in critical situations. (Accidents at intersections excluded).

BRIEF DESCRIPTION OF VIEWS IN DRAWINGS

OBJECTIVES OF THE INVENTION

The main purpose of this invention is to enable the driver to know at all times the actual position of the car relative to the two boundaries of the lane of travel. It is not sufficient, if steering is to be done safely, for the driver to depend upon a very inaccurate estimate. The imperative need is to be able to determine the crucial factors of position and direction accurately and conveniently without diverting attention from the constantly changing course of the lane ahead. The position of each delineator on the hood is not selected arbitrarily. They are mounted in conformance with precise and controlling geometric ratios by parking the car parallel and adjacent to the right boundary line of a lane then sighting, while seated in the normal driving posture, the point where the right boundary disappears beneath the hood. That point fixes the location of the right road delineator. The position of the left delineator is determined in the same manner after parking the left side of the car along the left boundary line. This process of installation is an intrinsic component of the invenion. The precise location of these safety features, and a knowledge of the processes involved in utilizing them, enable the driver to determine in a practical manner the exact distance of the car from either boundary of the traffic lane. This is the prime objective.

The following is a summary of other important general objectives:

To enable drivers to cope with critical emergencies knowing exactly where they are headed;

To facilitate the teaching of teenagers in the skills of driving;

To give greater control over the manipulation of vehicles by all people and especially by the elderly;

To dispell the fears, tensions and emotional disturbances associated with heavy traffic;

To change attitudes of irritability and annoyance into moods of calmness and contentment;

To give drivers the full measure of joy and pleasure which can be derived from traveling;

To permit safe driving along narrow roads and bridges;

To pass wide-load trucks and trailers without apprehension or danger;

To improve the driving ability of all motorists;

To induce confidence, comfort and alertness;

To provide a dependable marker to be noticed during the day or night;

To reduce slaughter and destruction by averting accidents;

To minimize the costs of damages and liability claims;

To alert drivers about the proximity of obstacles in the path ahead;

To eliminate guessing in dangerous situations;

To perceive the relationship between the delineator and its boundary line by scanning through the perephery of vision without distraction from the view ahead;

To provide a precise marker which measures the actual distance of the car from either side of the lane;

To permit cruising safely in the middle of the lane;

To embellish automobiles by the stylization and decorative finish of delineators.

DETAILED DESCRIPTION OF INVENTION

Figure 1:
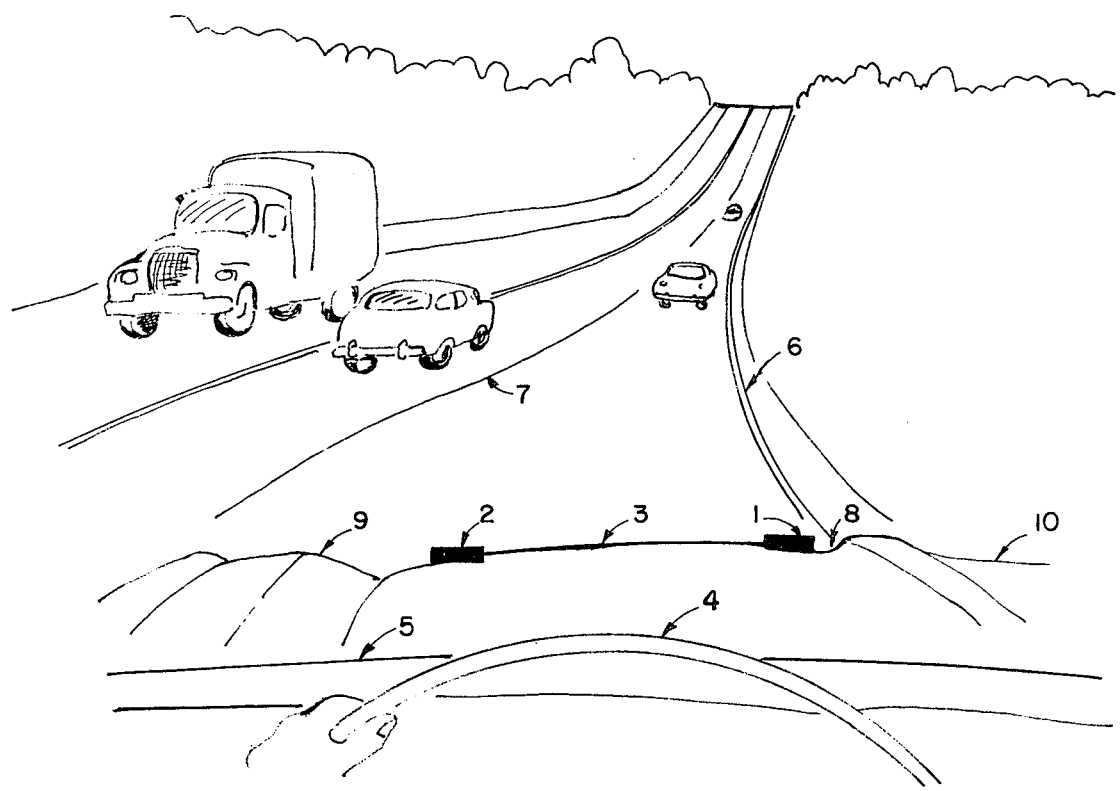
FIG. 1 is a perspective from the driver's seat showing the pair of road delineators, as safety features, mounted in front on the left side of the hood.

FIG. 1 shows the interrelationship of the pair of road delineators with the boundary lines of the traffic lane. The right delineator 1 is similar to the left delineator 2. Each is mounted toward the front of the car upon the left half of the hood 3 at a particular point which is determined by sighting, from the driver's seat, to align it in the line of sight with the nearest point of the adjacent boundary line when the car is parked in special manner relative to that boundary. The position of the driver behind the windshield 5 is indicated by the appearance of the steering wheel 4. The nearness of the right delineator 1 to the point 8 at which the right boundary line 6 vanishes beneath the front of the car signifies that the right side of the car is dangerously close to the right limits of the lane. The distance of the left delineator 2 from the left boundary line 7 measures the substantial distance of the vehicle from the left boundary. Left fender 9 indicates the position of the left light of the car and serves to orient the viewer with the features of the drawing and to help in the recognition of the various parts of the car as shown by the perspective. The right front of the hood 10 does not require the mounting of any steering aid.

Figure 2:
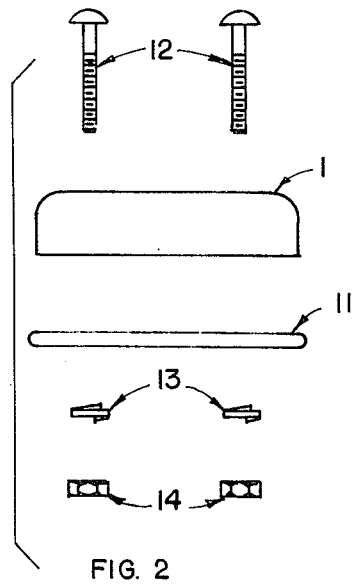
FIG. 2 is a detailed side view of one form of a road delineator, at a larger scale, together with the mounting parts arranged vertically in the order in which they are to be assembled on the car to serve as an effective guide or marker.
Figure 3:
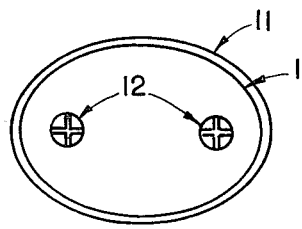
FIG. 3 is a top view of the delineator.
Figure 4:
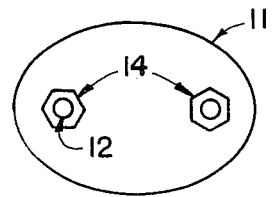
FIG. 4 is the bottom view.

Bolts 12 in detailed FIGS. 2, 3, and 4 are inserted through holes in right delineator 1, through cushion 11 and through slots in hood 3 not shown. Lockwasher 13 and nuts 14 are screwed to the bottom of bolts 12 and tightened beneath hood 3. Heads of bolts 12 are countersunk.

The successful functioning of a road delineator does not depend upon its exact form. As a steering aid it can serve just as well in the shape of a disk with a single hole at the center, or in the contour of a rectangular base having two holes. It can be in the form of a cone, a pyramid, a vertical shaft, a three-dimensional star, a diamond a figurine or other shapes. The shape would not normally affect its utility, however a standard uniform design adapted for all car models would be most advantagous because it could be universally recognized by all drivers.

Although the dimensions of delineators may vary within certain limits it is important that they correspond precisely with the model of car on which they are to be installed if these steering guides are to accommodate people with vision in only one eye.

The line at the top of the drawing in perspective represents trees and the outline of the horizon in the distance. Three cars are shown moving in the direction travelled by the driver while a truck moves from the opposite direction. These features are depicted because they are typical of the landscape viewed by motorists, and therefore are intrinsic to the functioning of the invention.

DISTINCTION BETWEEN THIS INVENTION AND THE PREVIOUS ART

A number of inadequate devices have been used in the past in attempts to estimate the distance of a car from the edge of a road while driving. The proved to be unreliable and hazardous. The most familiar one was the ornament at the center of the hood toward the front used as an indirect reference. The distance of the car from the edge of the road could oonly be roughly estimated by trying to remember the distance from an unmarked point on the hood to the ornament at the center. Most drivers found this distance to be very vaguely impressed upon their consciousness. A marking on the surface of the hood at the desired point could not be observed.

A raised solid shape is necessary for a definite measurement and observation.

The obsolete ornament at the center forced the driver to concentrate on disturbing calculations involving the mental subtraction of a vague distance of an indefinite point from the center of the hood and the rough computation of the total distance between the unmarked point and the boundary line. These processes were both complicated and confusing. The ornament was hazardous because is compelled the driver to shift the eyes from the condition of the traffic in front to the central ornament, then to the imaginary unmarked point and eventually to the boundary line.

Another disadvantage was in the differences in the distance between the imaginary point and the central ornament on the various car models. There was no simple conspicuous feature which could be readily recognized as a point of reference, by all drivers, on all cars.

A few auto manufacturers have devised ridges, valleys or contours along lines leading to the proper point of reference. These features were found to be impractical because there was nothing specific or definite enough to make the driver constantly aware of their purpose. Other lines were too often mistaken for these lines. There was not enough character or individuality to distinguish them. The lines on the hoods varied with the different models and there was no uniformity or standard of distinctiveness.

Stamping ridges, valleys or even road delineators upon the hood permanently also introduced other serious difficulties, because the precise location of the reference point on the hood is dependent the final dimensions.

Road delineators do not detract from scanning the road ahead as do ornaments at the center of the hood.

BASIC CONCEPTS

Processes for utilizing road delineators correctly are necessarily reconciled with the effects of two significant optical phenomena.

The first phenomenae relates to the double image. When a driver focusses his two eyes on a boundary line on the surface of the road while one of the road delineators is in the line of sight then that delineator will appear as two images. This is demonstrated by holding a pencil vertically at arm's length in front of the eyes and focussing the gaze on a spot on a wall about 10 feet away. The single pencil will appear as two. In order to reconcile this optical distortion with safe driving practices it is simply necessary to note the double vision of a road delineator and to perceive the correct reference point as being at the center of the two images. A road delineator 2 inches in length would appear as two delineators touching each other with a total length of approximately 4 inches. However the driver will encounter no problem if he avoids gazing at the point on a boundary line which vanishes beneath the hood. The double image of the delineator will not then manifest itself, and the driver will simply note the delineator within the perephery of view.

The other phenomena relates to the shifting of the position of a delineator relative to its adjacent boundary line when the driver alternately winks one eye then the other. This phenomena becomes an important factor when the driver can see with only one eye. A specific dimension in the road delineator then becomes significant and of practical value. Research has revealed that, in general, the length of a delineator, that is the distance from its left side to its right side, should be about 2 inches. Its precise length would depend upon such things as the length of the hood, the elevation of the car and the height of the seat. When the delineator is manufactured in the proper length then a one eyed driver could depend upon one side of the delineator or the other as the point of reference. The side to be used would depend upon whether he was blind in the right eye or the left, The right delineator is slightly longer than the left.

Variations in the height of a driver do not constitute a problem. Differences in the level of the eyes causes only a minute shift in the distance between either delineator and its adjacent boundary line. A person usually adjusts the seat forward or backward to accomodate his height while the line of inclination between the eyes and the road surface in front of the hood changes very little.

If for any reason the the alignment of a road delineator is not perfectly correct there are safeguards:
 (1) The driver can rely upon the margin of safety adopted when the delineators are installed which in all cases indicate that the car is a few inches closer to a boundary line than it actually is;
 (2) A driver can test the alignment of each delineator by driving the side tires along the bumpy reflectors embedded a boundary line. If any discrepancy is detected he can take note of it and interpret subsequent onservations accordingly;

(3) The positions of the delineators can be adjusted within the slots in the hood.

PROCESSES FOR INSTALLING ROAD DELINEATORS

Delineators may be installed at the factory or by the individual owners. Two people are needed for convenient and accurate installing. The car is first parked parallel with a straight line on a flat paved surface so that the straight line a short distance beyond the closest part of the near side of the car. One person assumes a normal driving posture with both hands on the steering wheel and with both eyes focussed on the point where the parallel line disappears beneath the hood. The other person adjusts the position of the corresponding delineator on the hood until the center of the double image of the delineator coincides with the extension of the boundary line which disappears beneath the hood as observed by the one in the driver's seat. The hood is then marked where each hole in the delineator is situated. An indentation is tapped with a metal punch at each marking and an opening or slot is drilled. This will be the place where the delineator will be mounted.

The car is then turned in the opposite direction and parked so that the other side is parallel to the straight line and the same distance away. The extra distance from the straight line makes the car appear to be closer to the boundary line than it actually is when the driver uses the delineator as a reference point, thereby providing the margin of safety to offset any discrepancy which may exist in the alignments. After marking and drilling the second delineator is attached. The longer delineator is placed toward the right of the shorter one.

PROCESS FOR USING THE INVENTION

The following simple rules are essential processes in utilizing road delineators:

(1) Maintain normal driving posture.
(2) Keep the eyes focussed primarily, as usual, upon the traffic lane ahead while scanning either boundary line intermittently for a short distance in front.
(3) Note within the peripheral vision, without diverting attention from the roadway, the changing distances between a delineator and a boundary line. When either delineator approaches a boundary it means that the car is getting closer to it. Conversely when a delineator moves away from a boundary the car moves from it also.
(4) While driving along a curve which veers toward the left the right delineator should be used in association with the right boundary line because the car is actually further from the right boundary than it appears to be. The left delineator should be used while curving toward the right.
(5) A person with vision in the left eye only should use the left side of a delineator instead of the center as a reference without focussing upon it. A person with sight in the right eye only should use the right side of a delineator.
(6) Two tabs attached near the bottom of the windshield of a vehicle without a hood in a particular location will serve the same functions as delineators.
(7) Delineators should not be used while making abrupt turns, nor while traveling over rough roads which cause the car to bounce excessively.

I claim:

1. For use with an automobile to help a driver maintain the automobile within the boundary lines of a traffic lane in which the automobile is traveling, a pair of steering guides, each affixed to the front of the hood in such a position and manner so as to enable the driver to sight thereover and determine whenever either side of the automobile approaches the boundary lines of the lane, one of said guides being positioned such that as the driver sits in his normal position and the automobile is traveling in a line in which the right side of the car is, with some margin of safety, just inside the right boundary line of the lane, the driver's eyes, said one guide, and the point at which the right boundary line of the traffic lane disappears from the driver's view under the hood of the automobile are in alignment, said one guide being further of an approximate size and positioned on the hood such that if the driver is looking with his left eye the left edge of the guide is in the aforesaid alignment and if the driver looks with his right eye the right edge is in the aforesaid alignment, the other of the said guides being of a predetermined size and being positioned such that if the driver is sitting in his normal position and the automobile is traveling in a line in which the left side of the car is, with some margin of safety, just inside the left boundary line of the lane, the driver's eyes, said other guide, and the point at which the left boundary line of the traffic lane disappears from the driver's view under the hood of the automobile are in alignment, said other guide being further of an approximate size and positioned on the hood such that if the driver is looking with his left eye the left edge of the guide is in the aforesaid alignment and if the driver looks with his right eye the right edge is in the aforesaid alignment.

* * * * *